Aug. 1, 1967   F. G. DEDEK ETAL   3,333,534
INDICIA ROLLING MACHINE AND METHOD
Filed July 16, 1964   4 Sheets-Sheet 2

INVENTORS
FRANK G. DEDEK
JAKOB RECH
BY *Irving Weiner*
AGENT

Aug. 1, 1967  F. G. DEDEK ETAL  3,333,534
INDICIA ROLLING MACHINE AND METHOD
Filed July 16, 1964  4 Sheets-Sheet 4

INVENTORS
FRANK G. DEDEK
JAKOB RECH

BY *Irving Weiner*
AGENT

United States Patent Office 3,333,534
Patented Aug. 1, 1967

3,333,534
INDICIA ROLLING MACHINE AND METHOD
Frank G. Dedek and Jakob Rech, Detroit, Mich., assignors to Burroughs Corporation, Detroit, Mich., a corporation of Michigan
Filed July 16, 1964, Ser. No. 383,061
10 Claims. (Cl. 101—6)

This invention relates to a machine and a method for impressing indicia into a workpiece, and more particularly to a machine and a method for pressure-rolling a workpiece with a die to impart to the workpiece various marks and shapes mating with those of the die.

It has become necessary in recent times to achieve a rapid, accurate and inexpensive way of manufacturing parts having various indicia raised thereon, such as printing wheels having raised or positive type characters disposed on the cylindrical periphery of the printing wheel. Many of the desired indicia or type characters are of such small dimensions that high accuracy and close to tolerances are matters of absolute necessity. Heretofore, laborious, time-consuming and very expensive engraving procedures were necessary to attain such printing wheels.

The present invention provides a method and a machine for manufacturing workpieces having indicia thereon in a relatively-easy manner and at the same time overcomes the disadvantages of the prior methods and mechanisms.

The present invention provides a method for impressing indicia into a workpiece, comprising the steps of: mounting a die member and a workpiece member for angular motion; imparting angular motion to the die member and the workpiece member; and urging these members into and out of indicia-forming relation while the members are undergoing the angular motion by curvilinearly translating at least one of these members while these members are undergoing the angular motion.

In particular, the present invention provides a method of pressure-rolling a workpiece with a die to impart to the workpiece various marks and shapes mating with those of the die, comprising the steps of: affixing the workpiece rigidly to a workpiece shaft; affixing the die rigidly to a die shaft; rotating the workpiece shaft in a first direction; rotating the die shaft in synchronism with and at the same speed of the rotation of the workpiece shaft but in a direction opposite to the first direction; pivoting one of the shafts relative to the other of the shafts to bring the workpiece and the die into pressure contact with each other while undergoing the rotational motions, whereby the various marks and shapes of the die impart corresponding mating marks and shapes to the workpiece during the synchronous rotational-pressure contact; and periodically reversing the direction of rotation of the workpiece shaft and of the die shaft.

The present invention also provides a machine for impressing indicia into a workpiece, which machine comprises in combination: a die member and a workpiece member mounted for angular motion; means for imparting angular motion to the die member and the workpiece member; and a mechanism for urging these members into and out of indicia-forming relation while these members are undergoing the angular motion, the mechanism including a pivotable shaft which causes at least one of the members to translate curvilinearly while the members are undergoing the angular motion.

In particular, the present invention provides a machine for pressure-rolling a workpiece with a die to impart to the workpiece various marks and shapes mating with those of the die, which machine comprises: a frame; a workpiece shaft rotatably supported within the frame; a die shaft rotatably supported within the frame; a motor connected to one of these shafts for imparting angular motion thereto; a first gear rigidly affixed to the workpiece shaft towards one end thereof, and the workpiece being rigidly affixed to the workpiece shaft towards the other end thereof; a second gear rigidly affixed to the die shaft towards one end thereof, and the die being rigidly affixed to the die shaft towards the other end thereof; the first and second gears cooperating with each other to transmit the angular motion from one of the shafts to the other of the shafts, and simultaneously permitting pivoting of the shafts relative to each other about a point of contact between the first and second gears; feed means associated with at least one of the shafts for pivoting the shafts relative to each other while the shafts undergo the angular motions, whereby the workpiece and the die are brought into pressure contact at a point remote from the pivot point; and lubricating means for applying a lubricant to the workpiece and the die when the workpiece and the die undergo the angular motions.

It is an object of the present invention to facilitate the forming of indicia on the surface of workpieces, and in particular workpieces composed of hard materials such as steel.

Another object of the invention is to provide a method and a machine for pressure-rolling a workpiece with a die to impart to the workpiece various marks and shapes mating with those of the die.

A further object is to provide a relatively-simple and inexpensive method of accurately forming raised type characters disposed around the periphery of a type drum or a type wheel.

Another object is to reduce the cost of making a type drum, or type wheel segments which may be affixed together to comprise a type drum.

An additional object of the invention is to provide a method and a machine for accurately pressure-feeding a metallic die into and against the periphery of a metallic workpiece blank while both the die and the workpiece blank are rotating or undergoing oscillatory angular motion.

In order that the disclosure will be more fully understood and readily carried into effect, the following detailed description is given with reference to the accompanying drawings in which.

Figure 1:
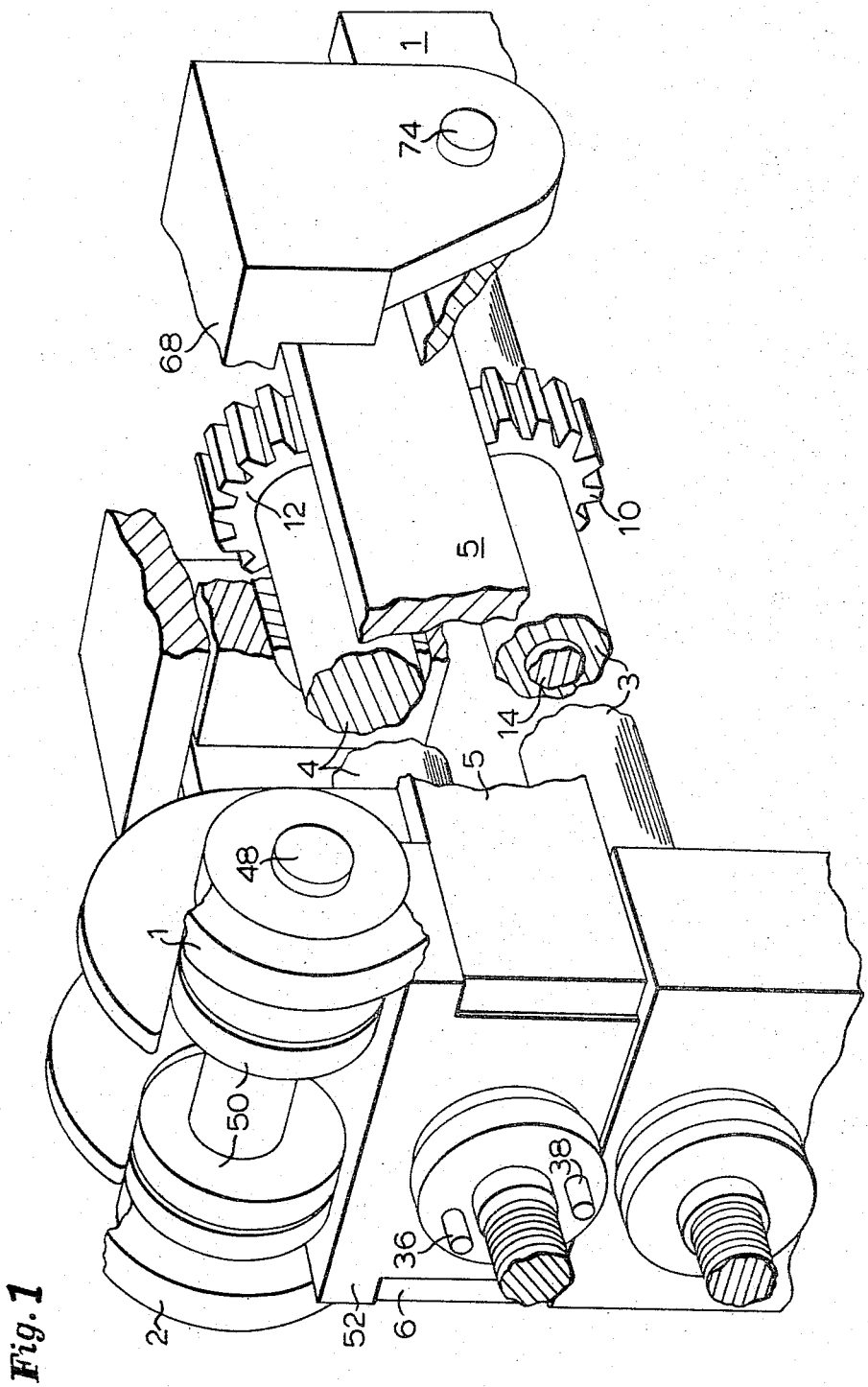
FIG. 1 is a perspective view of a machine embodying the present invention, having the right main frame and right inner frame broken away to show the die shaft and workpiece shaft construction.

FIG. 1 shows a preferred embodiment of the machine of the present invention, with certain portions broken away to permit viewing of the essential die shaft and workpiece shaft. The machine includes a right main side frame 1 and a left main side frame 2 which house a lower workpiece shaft 3 and an upper die shaft 4. Within the main side frames 1 and 2, an inner side frame is provided including a right inner side frame 5 and a left inner side frame 6 which may be adjustably moved within the main side frames 1 and 2. The adjustable movement of the inner side frames 5 and 6 controls the alignment of the die 7 (shown in FIG. 2) relative to the workpiece 8.

A motor (not shown) imparts rotary power to the workpiece shaft 3 at a location towards the right end of the workpiece shaft 3, as viewed in FIG. 1. A belt (not shown) rotatably connects the motor to the pulleys 9 shown in FIG. 3. As shown in FIG. 1, a gear 10 is integrally affixed to the workpiece shaft 3 towards the right end of the workpiece shaft 3. The rotary motion imparted to the workpiece shaft 3 and the gear 10 affixed thereon is transmitted to a gear 12 which is integrally affixed to the upper die shaft 4. The gear 10 on the workpiece shaft 3 is identical to the gear 12 on the die shaft 4. During all phases of the operation of the machine at least some portion of the gear 10 on the workpiece shaft 3 remains in driving contact with at least some portion of the gear 12 on the die shaft 4. Consequently, the rotary motion imparted from the motor to the workpiece shaft 3 is in turn transmitted to the die shaft 4 through the gears 10 and 12. The provision of the identical gears 10 and 12 ensures that the die shaft 4 will rotate at the same angular speed as that of the workpiece shaft 3, but the die shaft 4 will rotate in a direction opposite to that of the rotational direction of the workpiece shaft 3.

Figure 2:
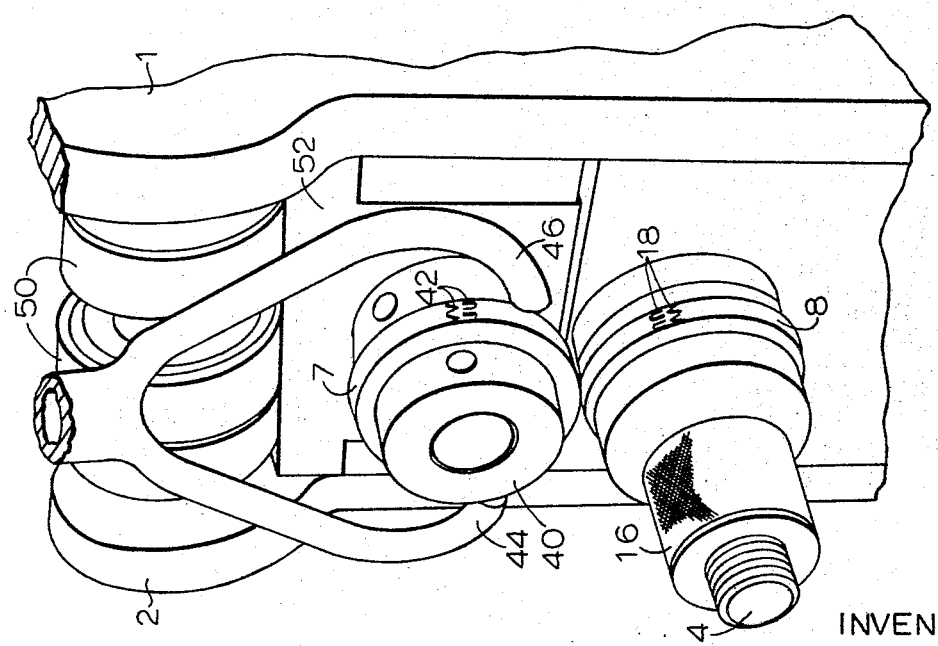
FIG. 2 is a perspective view of the left end of the machine shown in FIG. 1, showing the lubricant nozzles and the die and workpiece mounted in place.

The workpiece 8, shown in FIG. 2, is mounted towards the left end of the workpiece shaft 3 and at a point remote from the gear 10. Similarly, the die 7 is mounted towards the left end of the die shaft 4 at a correspondingly remote distance from its gear 12. The workpiece 8 and die 7 are not shown in FIGS. 1 and 4 to facilitate viewing the essential parts of the machine.

Figure 3:
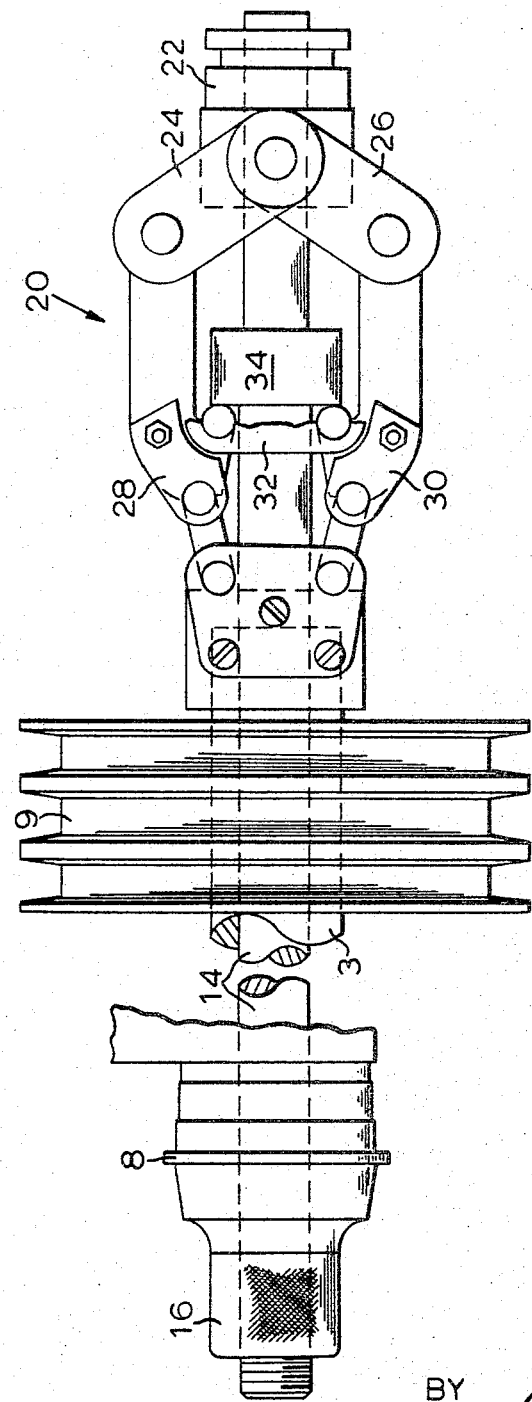
FIG. 3 is a view of the hydraulically-activated toggle joint, shown in open position, mounted on the right end of the workpiece shaft.
Figure 4:
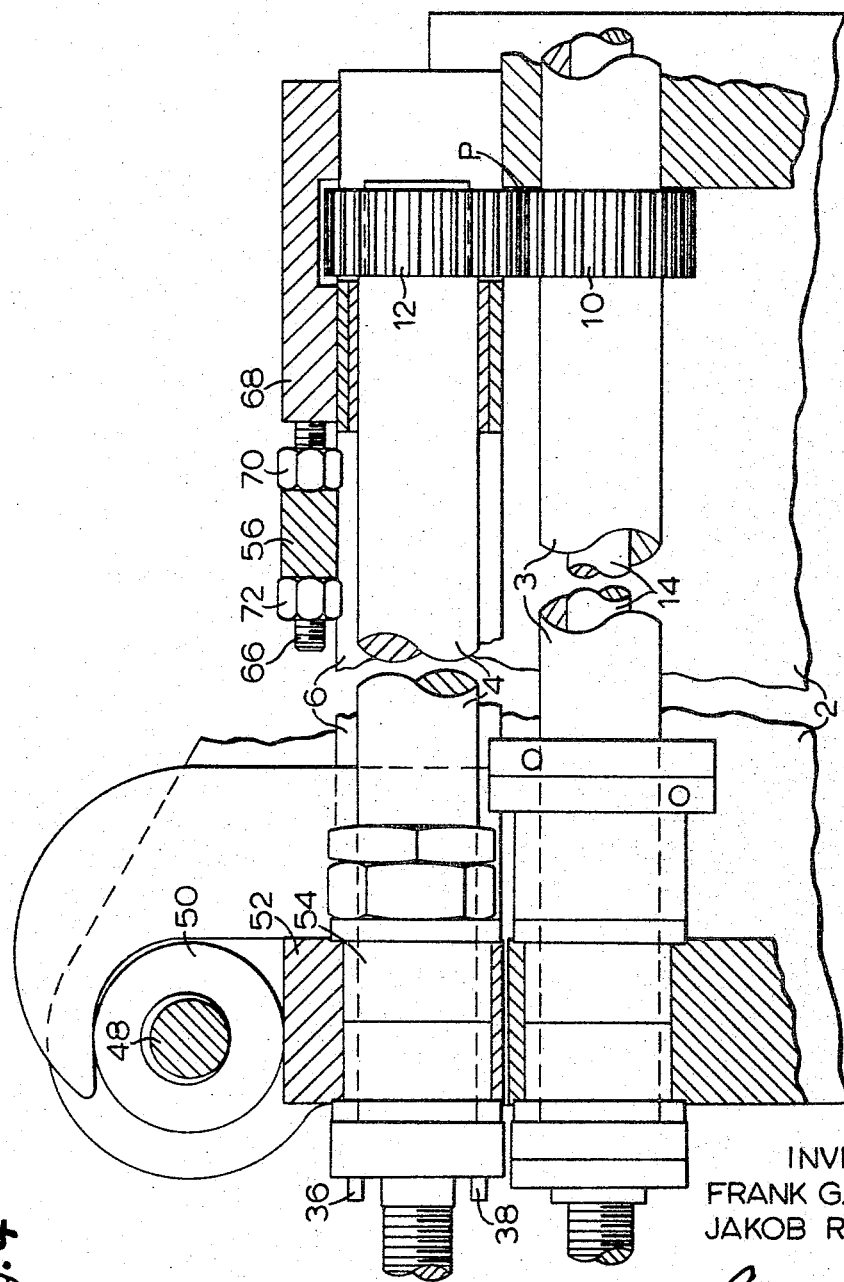
FIG. 4 is a fragmentary, elevation sectional view of the machine shown in FIG. 1.

With reference to FIGS. 1 and 4, it may be seen that the workpiece shaft 3 contains a coaxial inner shaft 14. This coaxial inner shaft 14 may be translated axially within the outer workpiece shaft 3. The leftmost end of the inner shaft 14 is threaded to mate with a correspondingly threaded collar 16 (shown in FIGS. 2 and 3). The workpiece 8, upon which it is desired to form the indicia mating with that of the die 7, is mounted on the left end of the inner shaft 14. The collar 16 is then threadedly engaged onto the inner shaft 14 to hold the workpiece 8 in position. It is extremely important to avoid any motion or slippage of the workpiece 8 relative to the workpiece shaft 3, as even the slightest slippage will result in distorted or doubled indicia or type characters 18 being formed on the workpiece 8. The workpiece 8 is in the shape of a cylindrical segment having an aperture in the center thereof to fit over the inner shaft 14. The workpiece 8 is not provided with any keyway or any alignment pin holes. Consequently, the possibility of the workpiece 8 moving relative to the workpiece shaft 3, especially when being pressure-rolled by the rotating die 7, must be prevented.

FIG. 3 shows a hydraulically-operated toggle or knuckle joint 20 which functions to urge the inner shaft 14 towards the right after the workpiece 8 and collar 16 have been mounted in position. This in turn urges the threadedly-engaged collar 16 at the left end of the inner shaft 14 tightly against the workpiece 8. A hydraulically-activated joint driver 22 moves to the left thus expanding the scissor-like arms 24 and 26 to a 180° position so that the arms 24 and 26 lie in a straight line when the toggle joint 20 is in an active or locked condition. The toggle joint 20 is shown in an inactive or open position in FIG. 3. When the arms 24 and 26 are in the straight line or locked position the grippers 28 and 30 connected to the ends of these arms 24 and 26 bear against the intermediate member 32 which is shown in a broken fashion in FIG. 3. This intermediate member 32 bears against a driven member 34 affixed to the inner shaft 14, and thereby urges this driven member 34 towards the right. This in turn serves to exert several tons of pressure between the collar 16 and the workpiece 8. It is this hydraulically-initiated pressure which holds the workpiece 8 rigidly against the workpiece shaft 3 and prevents any slippage which might occur when the workpiece 8 is subjected to the pressure and rotary forces exerted by the die 7.

The die 7 is mounted on the die shaft 4 in a different manner. FIGS. 1 and 4 show two diametrically-opposed alignment pins 36 and 38 affixed rigidly to the die shaft 4. The die 7, having two diametrically-opposed alignment holes, is mounted on the alignment pins 36 and 38. This prevents any slippage between the die 7 and the die shaft 4. After the die 7 is mounted on the alignment pins 36 and 38, a threaded member 40 (shown in FIG. 2) is threadedly engaged onto the left end of the die shaft 4 and tightened securely to firmly hold the die 7 on the die shaft 4.

As best seen in FIG. 4, the die shaft 4 and its rigidly affixed gear 12 may be pivoted relative to the workpiece shaft 3 and its rigidly affixed gear 10 about the pivot point P. This pivot point P is located on or near the right side of and between the teeth-engaging portion of the gears 10 and 12. An important feature of the present invention is that the pivot point P is remote from the ends of the workpiece shaft 3 and die shaft 4 supporting the workpiece 8 and the die 7, respectively. In practice, the pivot point P may be several feet from the workpiece 8 and die 7. Another very essential feature of the present invention is that the die shaft 4 may be pivoted relative to the workpiece shaft 3 while the gear 10 is transmitting rotary motion to the gear 12.

One purpose of the present invention is to produce a printing wheel or workpiece 8 having raised or positive printing characters 18 disposed on the cylindrical periphery of the printing wheel or workpiece 8. The printing wheel is made by pivoting or translating a rotating die 7 under pressure against the surface of a rotating workpiece 8. The die 7 is often referred to in the art as a master, or die matrix, having print characters 42 which are in negative or lowered fashion within the cylindrical periphery of the die 7, such as may be obtained by engraving characters 42 into the surface of the die 7. During the pressure-rolling contact of the workpiece 8, some portions of the workpiece surface are lowered and some portions are raised when the workpiece surface metal flows into the cavities or voids of the negative characters 42 on the die 7. It is essential to apply a coolant-lubricant to the interface between the die 7 and the workpiece 8 in order to achieve: proper cooling; relief of built-up stress and strain; proper flow of the workpiece metal into the die cavities; and printing characters 18 on the final workpiece 8 which are sharp and undistorted. The coolant-lubricant is supplied to the die 7 and the workpiece 8 automatically whenever rotary power is imparted to the workpiece shaft 3 and the die shaft 4 through the lubricant nozzles 44 and 46 shown in FIG. 2.

The particular coolant-lubricant which is employed is a very important factor in attaining acceptable printing wheels from the workpiece blanks. The coolant-lubricant which is selected will depend upon the composition of the workpiece 8, the composition of the die 7, the rotational speeds of the die 7 and workpiece 8, the pressure with which the die 7 is fed into or brought into contact with the workpiece 8, the height of the characters 18 to be produced on the workpiece surface, and many other factors. For making printing wheels having an outer diameter of about 3¼″ with printing characters which are raised approximately 0.020″ above the surface of the printing wheel, it was found that Houghton No. 3202 lubricant oil was a suitable coolant-lubricant.

As the rotary or oscillating angular motion is applied to the die 7 and workpiece 8, the die shaft 4 is pivoted about the pivot point P to bring the die 7 into engagement with the workpiece 8. The die 7 is then fed slowly into greater pressure contact with the workpiece 8. This pivoting and feeding motion is accomplished by the cooperation of a rotating feed shaft 48 with an eccentrically-mounted cam feed wheel 50 (shown best in FIG. 4). Rotation of the feed shaft 48 causes the eccentrically-mounted cam feed wheel 50 to urge the die shaft bearing block 52 downwardly toward the workpiece shaft 3. The die shaft bearing block 52 is provided with a suitable journal 54 to permit translation of the left end of the die shaft 4, and at the same time not interfering with the rotary motion of the die shaft 4.

In practice it has been found that if the workpiece 8 is permitted to rotate in only one direction and the die 7 is permitted to rotate only in the opposite direction, then the indicia or type characters 18 which result appear to be lop-sided or only partially formed. Properly shaped and fully completed indicia or type characters 18 are achieved when there is provision to reverse the directions of rotation of the workpiece shaft 3 and the die shaft 4. Accordingly, the workpiece shaft 3 and the die shaft 4 are initially rotated in initial directions; the die 7 is fed into pressure contact with the workpiece 8; the directions of rotation of the workpiece shaft 3 and the die shaft 4 are reversed; the die 7 is then fed again into pressure contact with the workpiece 8; and so on. It is believed that this reversal of the rotary motions improves the flowability of the surface metal of the workpiece 8 into the cavities of the die 7.

Rotary power for the feed shaft 48 may be supplied manually by providing a handle affixed perpendicular to the feed shaft 48. Alternatively, the feed shaft 48 may be rotated by hydraulic means. It was found satisfactory to connect a single hydraulic source of power to the feed shaft 48 and to the toggle joint driver 22.

Figure 5:
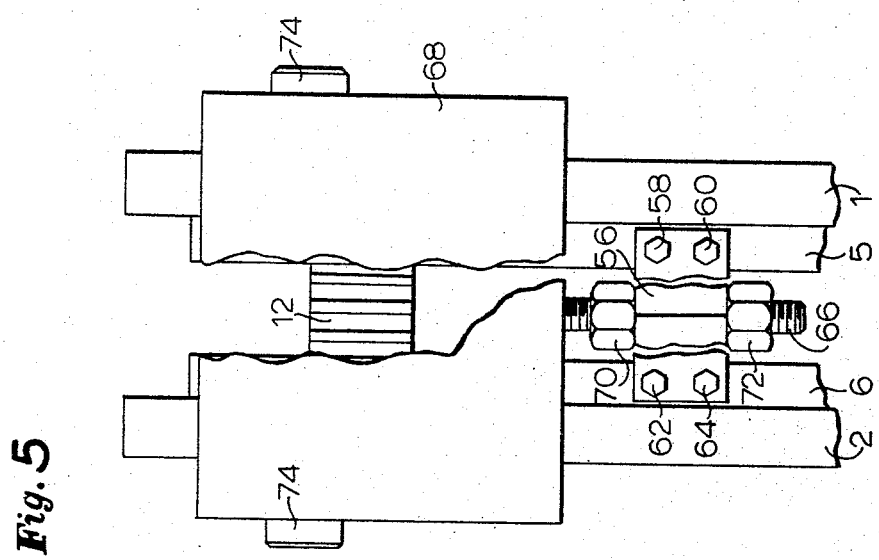
FIG. 5 is a fragmentary, top view of the inner frame adjusting means.

FIG. 5 shows the means employed for adjusting the inner side frames 5 and 6 relative to the main side frames 1 and 2. This adjustment only becomes necessary when the die 7 is not accurately aligned with the workpiece 8. A bridge piece 56 is rigidly joined to the right inner side frame 5 by bolts 58 and 60 and to the left inner side frame 6 by bolts 62 and 64. A threaded shank 66 is rigidly affixed to the pivotable canopy 68. The bridge piece 56 has an aperture through which the shank 66 passes. The nuts 70 and 72 threadedly engaged on the shank 66 on either side of the bridge piece 56 firmly secure the bridge piece 56 and the attached inner side frames 5 and 6 in any adjusted position. When it is desired to align the die 7 relative to the workpiece 8, the nuts 70 and 72 are loosened, the bridge piece 56 and inner side frames 5 and 6 are translated relative to the main side frames 1 and 2, and the nuts 70 and 72 are then tightened to secure the bridge piece 56 in its adjusted position. The bearing block 52 and die shaft 4, which are supported by the inner side frames 5 and 6, will translate a corresponding distance. The canopy 68, together with the bearing block 52, inner side frames 5 and 6, and the die shaft 4, is adapted to pivot about the pivot post 74 which is in line with pivot point P.

It may be desirable to provide a somewhat-elaborate lubricant-recovery or filtering system to remove any metal particles from the recovered lubricant which might damage the die 7 or workpiece 8. A filtering system including a mechanical filtering device and also a magnetic filtering device has been found satisfactory. A pan may be provided around the base of the machine to contain the sprayed lubricant.

An important feature of the present invention is the maintenance of a rotating die 7 and a rotating workpiece 8 in exact synchronism with each other while pressure rolling indicia into the workpiece 8. This is accomplished while providing a means of pivoting the die shaft 4 relative to the workpiece shaft 3. Providing the pivot point P at a remote distance from the die 7 and workpiece 8 permits the gears 10 and 12 to be kept in rotating engagement at all times while the die 7 and workpiece 8 located at the other ends of the die shaft 4 and workpiece shaft 3 may be curvilinearly translated into pressure-contact engagement.

It has been found that the final workpiece 8 produced by the machine of the present invention possesses a highly faithful reproduction of the die indicia 42. It is even possible to produce a die from the final workpiece 8. To accomplish this, after the workpiece 8 has been completed it is removed from the workpiece shaft 3; hardened by heat treatment or the like; and then placed on the die shaft 4 in lieu of the original die 7. A new workpiece blank is then mounted and secured on the workpiece shaft 3. The machine is then operated in the aforedescribed manner so that the raised or male characters 18 on the initial final workpiece 8 impart lowered or female characters into the new workpiece. Thus, the new workpiece is formed into a die similar to the original die 7. The new die may then be hardened and heat treated before it is employed to make additional workpieces. In this manner, several dies may be produced from one original master die 7, thus avoiding the undue wear and tear on the original die 7 which may occur if only the original die 7 is used for producing a plurality of workpieces.

It should be appreciated that the die 7 and workpiece 8 need not have the shape of cylindrical segments. The present invention may be utilized with dies and workpieces having any suitable surface of revolution. In such a case, the die and workpiece need not undergo motion of complete revolutions, but may undergo oscillatory angular motion, similar to a kneading process.

It should be noted that the foregoing description merely describes only one possible embodiment of the present invention. The invention is not limited to the described embodiment.

What is claimed is:

1. A machine for pressure-rolling a workpiece with a die to impart to the workpiece various marks and shapes mating with those of the die, comprising in combination:
   a frame;
   a workpiece shaft supported within said frame;
   a die shaft supported within said frame;
   a motor connected to one of said shafts for imparting motion thereto;
   first coupling means rigidly affixed to said workpiece shaft towards one end thereof, and said workpiece being rigidly affixed to said workpiece shaft towards the other end thereof;
   second coupling means rigidly affixed to said die shaft towards one end thereof, and said die being rigidly affixed to said die shaft towards the other end thereof;
   said first and second coupling means cooperating with each other to transmit said motion from said one of said shafts to the other of said shafts, and simultaneously permitting pivoting of said shafts relative to each other about a pivot point between said first and second coupling members; and
   feed means associated with at least one of said shafts for pivoting said shafts relative to each other while said shafts undergo said motion, whereby said workpiece and die are brought into pressure contact at a point remote from said pivot point.

2. A machine for pressure-rolling a workpiece with a die to impart to the workpiece various marks and shapes mating with those of the die, comprising in combination:
   a frame;
   a workpiece shaft rotatably supported within said frame;
   a die shaft rotatably supported within said frame;
   a motor connected to one of said shafts for imparting angular motion thereto;
   a first gear rigidly affixed to said workpiece shaft towards one end thereof, and said workpiece being rigidly affixed to said workpiece shaft towards the other end thereof;
   a second gear rigidly affixed to said die shaft towards one end thereof, and said die being rigidly affixed to said die shaft towards the other end thereof;
   said first and second gears cooperating with each other to transmit said angular motion from said one of said shafts to the other of said shafts, and simultaneously permitting pivoting of said shafts relative to each other about a pivot point between said first and second gears;
   feed means associated with at least one of said shafts for pivoting said shafts relative to each other while said shafts undergo said angular motions, whereby said workpiece and die are brought into pressure contact at a point remote from said pivot point; and lubricating means adapted to apply a lubricant to said workpiece and die when said workpiece and die undergo said angular motions.

3. An apparatus for forming indicia on or in the surface of a cylindrical member, comprising in combination:
- a first cylindrical member having indicia in or on its surface;
- a first rotatable shaft supporting said first member;
- a second cylindrical member having a surface on or in which indicia is to be formed;
- a second rotatable shaft supporting said second member;
- means for rotating at least one of said shafts;
- a first gear affixed to said first shaft;
- a second gear affixed to said second shaft and cooperating with said first gear to transmit rotary motion from one of said shafts to the other of said shafts, said second gear being identical to said first gear;
- a movable bearing block supporting one of said shafts; and
- feed means selectively moving said bearing block so that the angle between said shafts is varied to selectively bring said first and second cylindrical members into and out of indicia-forming contact with each other while said members are rotating.

4. An apparatus for forming raised characters on the surface of a workpiece, comprising in combination:
- a main frame;
- an inner frame pivotably mounted within said main frame;
- a first shaft rotatably supported by said main frame;
- a workpiece removably secured to said first shaft;
- a second shaft rotatably supported by said inner frame and disposed substantially parallel to said first shaft;
- a die removably secured to said second shaft and having intaglio characters in its periphery;
- a motor for rotating at least one of said shafts;
- a first gear affixed to said first shaft;
- a second gear affixed to said second shaft and cooperating with said first gear to transmit rotary motion from one of said shafts to the other of said shafts, said second gear being identical to said first gear;
- a movable bearing block affixed to said inner frame and supporting one end of said second shaft;
- feed means selectively moving said bearing block to vary the angle between said shafts to selectively bring said workpiece and die into and out of character-forming contact with each other while being rotated;
- an inner shaft coaxially and slidably disposed within said first shaft, said workpiece and a collar being mounted upon one end of said inner shaft;
- a hydraulically-operated toggle joint affixed to the other end of said inner shaft and selectively operative to pull said inner shaft relative to said first shaft so that said collar urges said workpiece tightly against said first shaft;
- lubricating means operative in response to energization of said motor to spray a lubricant-coolant upon said workpiece and die; and
- adjusting means mounted between said main frame and said inner frame to permit rectilinear translation of said inner frame relative to said main frame to align said die with said workpiece.

5. An apparatus according to claim 4, including means to reverse the direction of rotation of said motor at predetermined intervals during the character-forming operation of the apparatus.

6. A method of forming type characters on or in at least part of the periphery of a member, comprising the steps of:
- mounting a first member and a second member for rotary motion, said first member having first type characters in or on at least part of its periphery;
- rotating said first member in one direction;
- rotating said second member in an opposite direction;
- while rotating said first and second members, selectively bringing said members into and out of character forming contact with each other by curvilinearly displacing at least one of said members about a pivot point remote from said first and second members while said members are rotating to form on or in at least part of the periphery of said second member second type characters which are counterparts of said first type characters;
- rotating said first member in said opposite direction;
- rotating said second member in said one direction; and
- repeating the preceding steps until said second type characters are sharply-defined and are of the desired height or depth.

7. A method of pressure-rolling a workpiece with a die to impart to the workpiece various marks and shapes mating with those of the die, comprising the steps of:
- affixing a workpiece rigidly to a workpiece shaft;
- affixing a die rigidly to a die shaft;
- imparting angular motion to said workpiece shaft;
- imparting angular motion to said die shaft in synchronism with the motion imparted to said workpiece shaft but in the opposite sense; and
- while imparting said angular motion to said workpiece shaft and said die shaft, pivoting one of said shafts relative to the other of said shafts about a pivot point remote from said workpiece and said die to bring said workpiece and die into pressure contact with each other while undergoing said angular motions, whereby the various marks and shapes of said die impart corresponding mating marks and shapes to said workpiece during the synchronous angular motion-pressure contact.

8. A method according to claim 7, wherein said angular motion comprises oscillating said members and moving said members in opposite directions relative to each other.

9. A method according to claim 7, wherein said angular motion comprises rotating said members through at least one complete revolution and moving said members in opposite directions relative to each other.

10. An apparatus for forming raised characters on the surface of a workpiece, comprising in combination:
- a main frame;
- an inner frame pivotably mounted within said main frame;
- a first shaft rotatably supported by said main frame;
- a workpiece having the shape of a right-circular cylinder removably secured to said first shaft;
- a second shaft rotatably supported by said inner frame and disposed substantially parallel to said first shaft;
- a die having the shape of a right-circular cylinder removably secured to said second shaft substantially parallel and adjacent to said workpiece and having intaglio characters in its periphery;
- the outer diameter of said workpiece being substantially the same as the outer diameter of said die;
- a motor for rotating at least one of said shafts;
- a first gear affixed to said first shaft at a point remote from said secured workpiece;
- a second gear affixed to said second shaft at a point correspondingly remote from said secured die and cooperating with said first gear to transmit rotary motion from one of said shafts to the other of said shafts, said second gear being identical to said first gear;
- the distance between said workpiece and said first gear being the same as the distance between said die and said second gear;
- the ratio of said outer diameter of the workpiece or die to said distance between the workpiece or die and the first gear or the second gear, respectively, being approximately one to eight;

a movable bearing block affixed to said inner frame and supporting one end of said second shaft;

feed means selectively moving said bearing block to vary the angle between said shafts by curvilinearily displacing said die after said motor has commenced rotating said shafts to selectively bring said workpiece and die into and out of character-forming contact with each other while being rotated;

an inner shaft coaxially and slidably disposed within said first shaft, said workpiece and a collar being mounted upon one end of said inner shaft;

a hydraulically-operated toggle joint affixed to the other end of said inner shaft and selectively operative to pull said innner shaft relative to said first shaft so that said collar urges said workpiece tightly against said first shaft;

lubricating means operative in response to energization of said motor to spray a lubricant-coolant upon said workpiece and die;

adjusting means mounted between said main frame and said inner frame to permit rectilinear translation of said inner frame relative to said main frame to align said die with said workpiece; and means to reverse the direction of rotation of said motor at predetermined intervals during the character forming operation of the apparatus.

References Cited

UNITED STATES PATENTS

| | | | |
|---|---|---|---|
| 54,515 | 5/1866 | Eldridge et al. | 101—6 X |
| 95,344 | 9/1869 | Hill | 101—6 X |
| 253,950 | 2/1882 | Smith | 101—6 |
| 1,153,550 | 9/1915 | Hamilton | 101—1 |
| 1,246,575 | 11/1917 | Fickling et al. | 101—126 |
| 1,374,225 | 4/1921 | Peacock | 101—6 |
| 1,796,387 | 3/1931 | Mountford | 101—6 X |
| 2,038,759 | 4/1936 | Roberts | 101—401.2 |
| 2,250,349 | 7/1941 | Berquist | 101—106 |
| 2,441,862 | 5/1948 | Wutscher | 101—6 |
| 2,602,397 | 7/1952 | Last | 101—401.5 |
| 2,654,317 | 10/1953 | Rutbell et al. | 101—401.5 |
| 3,002,452 | 10/1961 | Christoff | 101—401.2 |

WILLIAM B. PENN, *Primary Examiner.*